United States Patent [19]

Ott et al.

[11] Patent Number: 4,986,439

[45] Date of Patent: Jan. 22, 1991

[54] CAP FOR THE FILLER NECK OF LIQUID CONTAINERS

[76] Inventors: Siegfried Ott, Waginger Strasse 46, 8221 Traunstein-Hufschlag, Fed. Rep. of Germany; Friedrich Wimmer, Oberholzleiten 15, 5231 Schalchen, Austria

[21] Appl. No.: 439,691

[22] Filed: Nov. 21, 1989

[30] Foreign Application Priority Data

Jun. 9, 1989 [DE] Fed. Rep. of Germany ....... 3918947

[51] Int. Cl.⁵ .............................................. B65D 43/16
[52] U.S. Cl. .................................... 220/334; 220/259; 220/343; 220/DIG. 33; 220/254
[58] Field of Search ................ 220/254, 256, 259, 260, 220/263, 334, 336, 337, 343, 355, 85 F, 85 S, 86 R, DIG. 33

[56] References Cited

U.S. PATENT DOCUMENTS

| | | | |
|---|---|---|---|
| 2,551,058 | 5/1951 | Selzler et al. | 220/254 |
| 2,657,824 | 11/1953 | Mariani | 220/343 |
| 3,344,947 | 10/1965 | Gallup | 220/334 |
| 4,091,959 | 5/1978 | O'Banlon | 220/86 R |
| 4,498,600 | 2/1985 | Blion | 220/DIG. 33 |
| 4,527,825 | 7/1985 | Clouse | 220/337 |
| 4,630,749 | 12/1986 | Armstrong et al. | 220/86 R |
| 4,632,270 | 12/1986 | Sasaki et al. | 220/86 R |
| 4,702,386 | 10/1987 | Boehmer et al. | 220/85 F |
| 4,809,863 | 3/1989 | Woodcock et al. | 220/85 F |

Primary Examiner—Stephen Marcus
Assistant Examiner—Vanessa Roberts
Attorney, Agent, or Firm—Sixbey, Friedman, Leedom & Ferguson

[57] ABSTRACT

A self-closing cap for the filler neck of liquid containers, consisting of a closure ring having an annular seal, said ring being attachable to said filler neck, and of a spring-biased closure flap swivel-mounted on said closure ring and provided with a seal, wherein said closure flap is swivel-mounted with two bearing arms to a shaft supported by a bearing block inserted in a recess on the housing ring and wherein a locking spring seated on said shaft of said bearing block biases said closure flap, with one on end of said spring engaging said closure flap or a bearing arm and the other end engaging said bearing block.

7 Claims, 1 Drawing Sheet

CAP FOR THE FILLER NECK OF LIQUID CONTAINERS

BACKGROUND OF THE INVENTION

This invention refers to a self-closing cap for the filler necks of liquid containers such as barrels, canisters, tanks and the like, as well as fuel tanks of motor vehicles, consisting of a closure ring with a seal, said ring being attachable to the filler neck, and of a closure flap swivel-mounted on said closure ring and provided with a seal, said flap being opened during the filling of the container by the nozzle of a hose or similar arrangement inserted into the filler neck and automatically closing under the influence of a spring upon withdrawal of the nozzle from the filler neck.

A wide variety of filler neck caps of the type in question has become known. For the most part, they are complex in design and have complicated forms, resulting in relatively high production costs for the cap.

OBJECT OF THE INVENTION

The object of the invention is to create a cap for the filler necks of liquid containers, with a simple, uncomplicated design, to enable it to be inexpensively manufactured and mounted, but without detracting from its functionality.

For the solution of this problem in accordance with the invention it is proposed that the cap in question be designed as given in claim 1. Additional advantageous features of the cap are to be found in the subclaims, as well as the following description of a particularly preferred embodiment shown in FIGS. 1 and 2 of the drawings.

Figure 1:
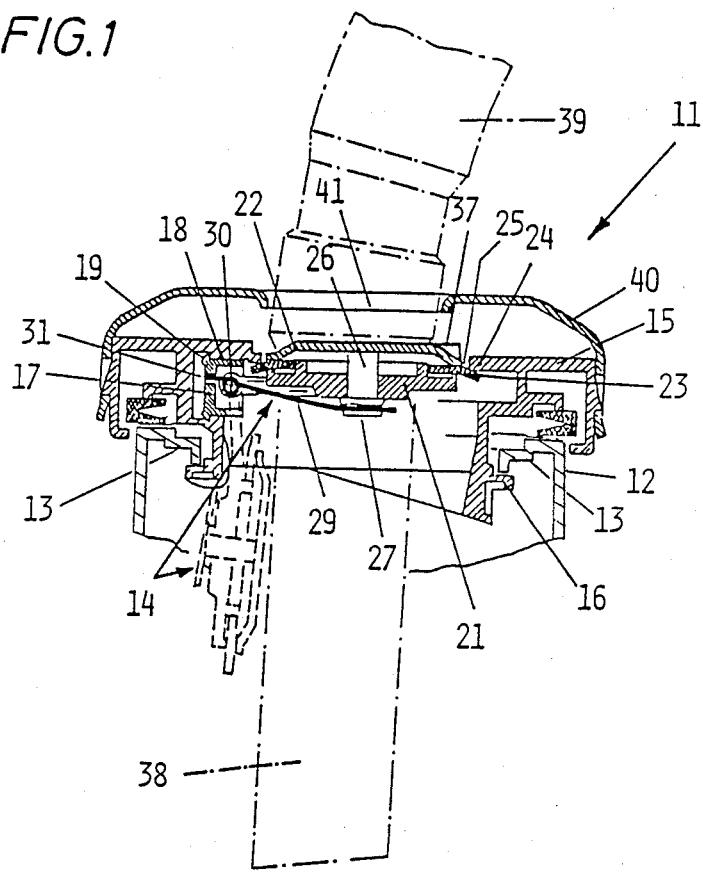
FIG. 1 shows a section through the cap attached to the filler pipe of a liquid container.

As visible in FIG. 1, the cap 11 designed according to the invention is attached to the mouth of a filler neck 12 of a liquid container or the like. Associated therewith is a bayonet joint ring 13 on the mouth of the filler neck 12, with either the cap 11 with its swivel-mounted closure flap 14 according to the invention or another closure lid being attachable thereto.

Figure 2:
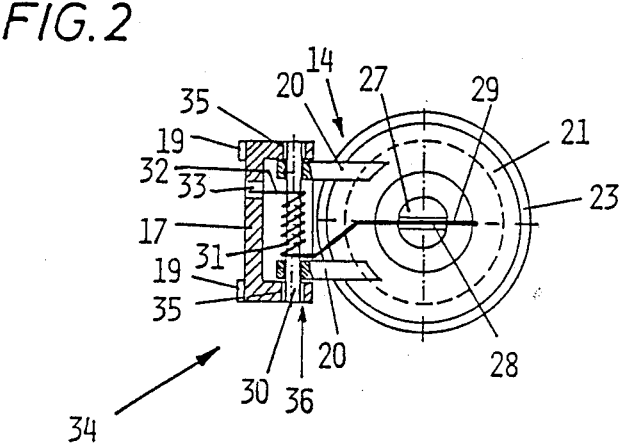
FIG. 2 shows a plan view of the lower or back side of the swivel-mounted closure flap and its bearing.

The cap 11 comprises a closure ring 15 with bayonet catches 16 to fasten it to the bayonet joint ring 13 of the filler neck 12. The closure flap 14 is swivel-mounted on the closure ring 15 by means of a bearing block 17, as can be seen particularly in FIG. 2. A recess 18 into which the bearing block 17 can be inserted and secured is located on the inner side of the closure ring 15; the bearing block is secured advantageously by means of locking teeth 19 disposed on the bearing block 17.

The closure flap 14 consists of an inner disc 21 with bearing arms 20 and an outer disc 22 connected thereto. An annular seal 23 is clamped between the two discs 21 and 22. In order to provide a tight closure of the orifice 25, this seal abuts the rim 24 of the orifice 25 in the closure ring 15, to be closed by the closure flap 14. A central pin 26 seated on the outer disc 22 serves to connect the two discs 21 and 22. A threaded head 27 is mounted on the free end of said pin and is provided with a radial groove 28 to receive the one end 29 of the locking spring 31 seated on the bearing shaft 30, the second end 32 of said spring mating with a notch 33 in the bearing block 17.

Thus the closure flap 14 with its bearing forms a preassembled unit 34 capable of being simply and therefore economically mounted and secured during the final assembly of the cap 11, as all that is required is the insertion of the bearing block 17 into the recess 18 in the closure ring 15.

To guarantee a faultless seal between the closure flap 14 and the edge 24 around the orifice 25 in the closure ring 15, i.e. to guarantee a perfect abutment of the annular seal 23 against its seat along the rim 24, a certain, adequately dimensioned amount of play 36 exists between the bearing bores 35 for the bearing shaft 30 and the shaft itself, making it possible for the inner disc 21 of the closure flap 14 to fully urge the annular seal 23 peripherally against its seat. This bearing play 36 makes it possible to compensate tolerances conditioned by manufacturing and assembly in the simplest manner.

In order to always attain faultless centering of the closure flap 14 relative to the orifice 25 in the closure ring 15, centering studs 37 are provided on the outer disc 22 of the closure flap 14, one of which is located diametrally to the bearing shaft 30.

In order to fill a liquid container on the filler neck of which the cap 11 according to the invention is mounted, it is merely necessary to insert the nozzle 38, shown with dotted lines, of a device 39 through the orifice 25 in the closure ring 15 and into the filler neck 12, wherein the closure flap 14 is swung to the side against the pressure of the locking spring 31. Upon completion of the filling, the nozzle 38 is withdrawn, with the closure flap 14 automatically reclosing the orifice 25.

The cap 11 is advantageously provided with a cover 40 having a central aperture 41 disposed coaxially to the orifice 25 in the closure ring 15. The cover 40 can be clamped fast to the closure ring 15 or secured by latching means known per se.

Closures of the type in question offer the advantage of eliminating the necessity of removing the filler neck cap each time, as is otherwise the case when liquid containers must be filled frequently.

What is claimed is:

1. A self-closing cap for the filler neck of liquid containers, consisting of a closure ring having an annular seal, said ring being attachable to said filler neck, and of a spring-biased closure flap swivel-mounted on said closure ring and provided with a seal, wherein said closure flap (14) is swivel-mounted with two bearing arms (20) to a shaft (30) supported by a bearing block (17) inserted in a recess (18) on the housing ring (15) and wherein a locking spring (31) seated on said shaft (30) of said bearing block (17) biases said closure flap (14), with one on end (29) of said spring engaging said closure flap (14) or a bearing arm (20) and the other end (32) engaging said bearing block (17).

2. A cap according to claim 1, wherein said bearing block (17) inserted in said recess (18) on the housing ring (15) is latched onto said housing ring.

3. A cap according to claim 1 wherein said closure flap (14) consists of an inner disc (21) provided with two bearing arms (20) and an outer cover disc (22) clamping an annular seal (23) between itself and said inner disc (21).

4. A cap according to claim 3, wherein said two discs (21, 22) of said closure flap (14) are interconnected by a central pin (26) and a threaded head (27), with a radial groove (28) for receiving one end (29) of said locking spring (31) being located in the upper side thereof.

5. A cap according to one of claim 1, wherein a radial play (36) compensating manufacturing tolerances exists between bearing bores (35) for said bearing shaft (30) in said bearing block (17) and said bearing shaft (30).

6. A cap according to claim 5 wherein at least one centering stud (37) effective diametrically to said bearing shaft (30) in a radial direction is located on said outer disc (22) of said closure flap (14).

7. A cap according to one of claim 1, characterized by a cover (40) with a central aperture (41) coaxial to said closure flap (14), for the insertion of the nozzle (38) of a filling device (39).

* * * * *